United States Patent [19]

Kuwabara et al.

[11] 4,391,519

[45] Jul. 5, 1983

[54] AXIS-MONITORING APPARATUS FOR A LASER BEAM

[75] Inventors: Kouji Kuwabara; Hiroyuki Sugawara, both of Hitachi; Toshiharu Shirakura, Tokai; Kouji Sasaki; Satoshi Takemori, both of Hitachi, all of Japan

[73] Assignee: Hitachi, Ltd., Tokyo, Japan

[21] Appl. No.: 186,731

[22] Filed: Sep. 12, 1980

[30] Foreign Application Priority Data

Sep. 12, 1979 [JP] Japan ................................ 54-116195

[51] Int. Cl.³ ............................................. G01B 11/27
[52] U.S. Cl. ............................ 356/153; 219/121 LU
[58] Field of Search ................. 356/138, 153, 375; 372/71, 109; 219/121 LU, 121 LV, 121 LW, 121 LX; 350/172, 174

[56] References Cited

U.S. PATENT DOCUMENTS

| 3,571,748 | 3/1971 | Koester | 356/138 |
| 3,892,488 | 7/1975 | Edmonds | 356/153 |
| 4,208,636 | 6/1980 | German | 372/71 |

FOREIGN PATENT DOCUMENTS 55-156687 12/1980 Japan .......................... 219/121 LV

*Primary Examiner*—William H. Punter
*Attorney, Agent, or Firm*—Antonelli, Terry & Wands

[57] ABSTRACT

A laser beam axis monitoring apparatus which includes a laser oscillator generating a laser beam and a light generator for generating a light for monitoring an axis of the laser. The light from the light generator is split into ring-shaped light and reflected or lead into the laser oscillator. The light in the laser oscillator is reflected by a total reflection mirror and passes out of the oscillator so that the axis of the laser beam and axis of the light coincide with each other.

11 Claims, 4 Drawing Figures

AXIS-MONITORING APPARATUS FOR A LASER BEAM

BACKGROUND OF THE INVENTION

The present invention relates to a laser beam arrangement and, more particularly, to a laser beam axis-monitoring apparatus.

Laser beams are generally employed for welding, fusion, surface treatment, etc. of a workpiece wherein the laser beam is generated by a laser oscillator which includes a discharge tube and two mirrors, with the discharge tube being filled with a laser medium. The two mirrors are a total-reflection mirror and an output-reflection mirror, with each of the mirrors being mounted at respective ends of the discharge tube.

In using, for example a $CO_2$ laser oscillator in, for example, welding, drilling, cutting, etc., one problem which arises is that a wavelength of the $CO_2$ laser is in an invisible region so that the beam of the laser cannot be observed. Because of the lack of visible beam of light, considerable difficulties arise in, for example, positioning of the work piece which is necessary to ensure a proper processing thereof.

In U.S. Pat. No. 3,892,488, an arrangement is proposed for enabling a proper position of a work piece to be processed. More particularly, in the proposed construction, a He-Ne laser, having an oscillation wavelength in the visible region so as to provide for a visible beam of light is employed and, during a positioning of the workpiece, light from a light generator is projected onto an intermediate reflection mirror which is inserted between the laser oscillator and the workpiece with the light being superposed on an optical path of the laser beam. A diameter of the beam of light is approximately 1 mm and is as small as about 1/20 to 1/50 of a diameter of the beam of the laser. Therefore, the intermediate reflection mirror and light generator are arranged in advance so that a center axis of the laser beam and axis of the light ray coincide with each other.

In order to permit a laser oscillator to oscillate under the best conditions, it is often required that, the inclination of the total reflection mirror be changed so as to maximize the power of the laser. However, when the inclination of the total reflection mirror has been changed, the optical path of the laser beam naturally changes.

In the laser beam access monitoring apparatus proposed in the aforementioned United States Patent, when the inclination of the total reflection mirror has been changed, the path of light from the light generator has not been changed because the light is reflected by the intermediate reflection mirror and led to the workpiece. However, with a change of the inclination of the total reflection mirror, the somewhat troublesome operation of bringing the optical paths of the laser beam and light beam into coincidence is once again required and it is impossible to always monitor the axis of the beam of the laser beam or the projected position of the laser. Therefore, the possibility arises that the workpiece will not be processed or worked in the desired manner.

SUMMARY OF THE INVENTION

The aim underlying the present invention essentially resides in providing a laser beam access monitoring apparatus wherein it is possible to always monitor the beam axis and projected position of the laser beam so as to enable a prompt and accurate processing of a workpiece.

In accordance with advantageous features of the present invention, a laser beam access monitoring apparatus is provided which includes a laser oscillator generating a laser beam and a light generator for generating a light for monitoring the access of the laser. The light from the light generator is lead into the laser oscillator, reflected by a mirror therein and taken out therefrom so that an axis of the laser and an axis of the light coincide with each other.

Advantageously, in accordance with the present invention, the mirror in the laser oscillator is a concave mirror. A beam splitter may be provided for transforming the light into a ring-shaped light and a ring-shaped mirror, having a hole at the center thereof, may be provided wherein light from a beam splitter is reflected by the ring-shaped mirror and the light and laser from the laser oscillator pass through the hole of the ring-shaped mirror.

In accordance with further features of the present invention, the hole of the ring-shaped mirror has a 45° elliptical shape and, advantageously, the light source for the beam of light is a He-Ne laser.

Advantageously, the laser beam axis monitoring apparatus of the present invention also includes focusing means such as lens or concave mirror for focusing the light and the laser, with the focusing means being capable of focusing the light and laser beam passing through the hole of the ring-shaped mirror.

The advantages of the present invention reside in the fact that, since the light from the light generator or light source is lead into the laser oscillator and taken therefrom as well as the laser beam, the axes of the laser beam and axes of the light coincide with each other. Additionally, by virtue of the provision of the intermediate reflection mirror, provided with a hole through which the laser beam is passed, and by virtue of the fact that the light is reflected by the reflective portions surrounding the hole, it is possible to superpose the light on the optical path of the laser beam in the form encompassing the laser beam so that the laser beam may be monitored at all times. Thus, any deviation of the axis of the beam of the laser beam can always be corrected and a workpiece can be processed promptly and efficiently.

Accordingly, it is an object of the present invention to provide a laser beam axis monitoring apparatus which avoids, by simple means, shortcomings and disadvantages encountered in the prior art.

Another object of the present invention resides in providing a laser beam axis monitoring apparatus by which it is possible to always coincide the axes of the light of a light generator or light source and the laser beam with each other even when the inclination of the total reflection mirror of the laser oscillator is changed.

A further object of the present invention resides in providing a laser beam access monitoring apparatus which constantly monitors the position of the laser beam.

A still further object of the present invention resides in providing a laser beam axis-monitoring apparatus which enables a prompt and accurate processing of workpieces thereby.

A still further object of the present invention resides in providing a laser beam axis monitoring apparatus which is simple in construction and therefore relative inexpensive to manufacture.

These and other objects, features, and advantages of the present invention will become more apparent from the following description when taken in connection with the accompanying drawing which shows, for the purposes of illustration only, two embodiments in accordance with the present invention.

DETAILED DESCRIPTION

Figure 1:
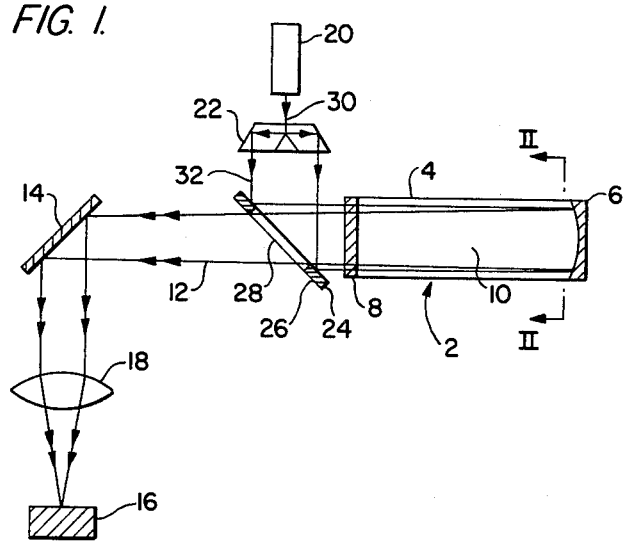
FIG. 1 is a partially schematic side cross sectional view of a laser beam axis monitoring apparatus in accordance with a first embodiment of the present invention.

Referring now to the drawing wherein like reference numerals are used throughout the various views to designate like parts and, more particularly, to FIG. 1, according to this Figure, a laser beam access monitoring apparatus is provided wherein a laser beam is generated by a laser oscillator generally designated by the reference numeral 2. The laser oscillator 2 includes a discharge tube 4 and two mirrors 6, 8 arranged at respective ends of the discharge tube 4. The discharge tube 4 is filled with a laser medium 10, with the mirror 6 being a total reflection mirror and the mirror 8 being an output mirror. The total reflection mirror 6 is formed as a concave mirror having a large radius of curvature and is mounted at one end of the discharge tube, with the output mirror 8 being mounted at the other end thereof.

The laser medium 10 in the laser oscillator 2 is excited, in a conventional manner, by excitation means (not shown) such as, for example, a glow discharge so as to form an inverted population. A laser beam 12, amplified by the stimulated omission, has a part thereof transmitted through the output mirror 8 and is passed to the exterior. The laser beam 12 is refracted in the orthogonal direction by means of an outer reflection mirror 14 and is projected onto a workpiece 16 through a focusing lens 18. A light generator 20 such as, for example, a He-Ne laser; generates a visible beam of light 30. A beam splitter 22 is arranged in correspondence with the light generator 20 and transforms the light beam 30 into a ring-shaped light 32. An intermediate reflection mirror 24 is arranged in front of the output mirror 8 of the discharge tube 4, with the intermediate reflection mirror 24 being inclined at 45° toward the discharge tube 4 and the beam splitter 22. The intermediate reflection mirror 24 is constructed of a reflective portion 26 and a hole 28 formed inside the reflective portion 26, with the hole 28 having a 45° elliptical shape since the intermediate reflection mirror 24 inclines 45° toward the beam splitter 22 and the discharge tube 4.

The laser beam axis-monitoring apparatus of the present invention operates in the following manner:

A light beam 30 from the light generator 20 passes through the beam splitter 22 and is transformed into the ring-shaped light 32. The ring-shaped light 32 from the beam splitter 22 is reflected by the reflective portion 26 of the intermediate reflection mirror 24 and led into the laser oscillator 2.

Figure 2:
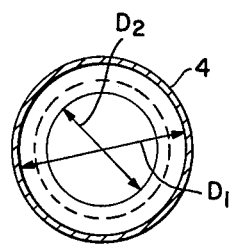
FIG. 2 is a cross sectional view taken along the line II—II in FIG. 1.

In the laser oscillator 2, the reflected light from the intermediate reflection mirror 24 is reflected by the total reflection mirror 6. The reflected light is superposed on the optical path of the laser beam 12 and the light and laser beam 12 pass through the output mirror 8 and out of the laser oscillator 2. The light and laser beam from the laser oscillator 2 pass through the hole 28 of the intermediate reflection mirror 24. Since the total reflection mirror 6 is formed as a concave mirror having a large radius of curvature, as shown in FIG. 2, the laser beam 12, within the discharge tube 4, has a diameter $D_1$ on a side of the total reflection mirror 6 and is, in contrast, reduced to a diameter of $D_2$ on an output side of the reflection mirror 8 thereby establishing the relationship of $D_1 > D_2$.

Accordingly, when the size or diameter of the hole 28 is made to equal the diameter $D_2$ of the laser beam, there need be no concern that the laser beam 12 will be intercepted. The light and laser beam are refracted in the orthogonal direction or downwards by the outer reflection mirror 14, with the refracted light and laser beam being finely tuned or focused by the focusing lens 18. Consequently, by the arrangement proposed by the present invention, the laser beam and the light fall on the workpiece 16 at all times.

As noted above, the operation of changing the inclination of the total reflection mirror 6 so as to maximize the laser power, that is, so as to permit the laser oscillator to oscillate under the best conditions, is often required. When the inclination of the total reflection mirror 6 has been changed, the optical path of the laser beam naturally changes. However, with the construction of the present invention, by virtue of the introduction of light into the laser oscillator 2 and thereafter taking the light out of the laser oscillator 2 along with the laser beam, the projected position of the laser beam and projected spot of light would be coincident at all times. Thus, by virtue of the present invention, the troublesome operation of bringing the optical paths of the laser beam and light into coincidence each time there is a change in the inclination of the total reflection mirror 6 is unnecessary and, therefore, the overall processing of work pieces can be done in a more rapid manner.

Figure 3:
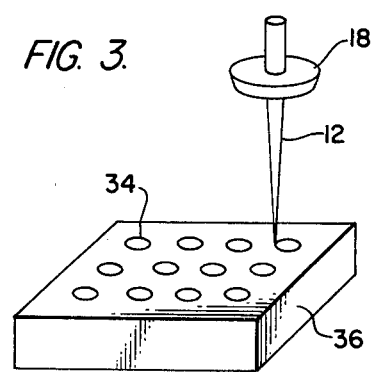
FIG. 3 is a schematic perspective view of a work piece during a processing thereof with a laser beam axis monitoring apparatus of the present invention.

More particularly, as shown in FIG. 3, with a work piece 36 wherein a plurality of portions 34 are discontinuously arranged on the workpiece 36, the projected position of the laser beam needs to be adjusted for every portion 34 to be processed or worked. In this case, if the positions of the outer reflection mirror 14 and focusing lens 18 are moved or the workpiece 36 is moved so that the projected spot of light continually thrown on the workpiece 36, may come to the portion 34 to be processed, then the projected position of the laser beam can also be adjusted thereby enhancing the overall efficiency of the working of the workpiece 36. Additionally, since the laser beam is always monitored with the light, any deviation of the beam axis of the laser beam as caused by movements of the outer reflection mirror 14 or focusing lens 18 is immediately noticed.

Figure 4:
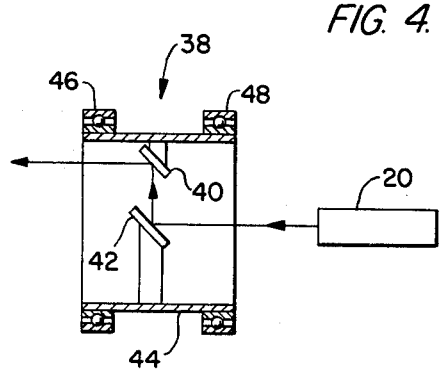
FIG. 4 is a partially schematic side cross sectional view of an alternate embodiment of a beam splitter for use in a laser beam access monitoring apparatus in accordance with the present invention.

While the beam splitter 22 is employed in order to transform the light beam 30 into a ring-shaped light, as shown in FIG. 4, a beam splitter generally designated by the reference numeral 38 may be employed whereby light from a light source or light generator 20 is reflected by reflection mirrors 40, 42 fixed at an angle of 45° within a rotary drum 44. With such an arrangement, the light beam rotates about a center axis of the rotary drum 44 which is held by bearings 46, 48 and is rotated by a conventional driving device (not shown).

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A laser beam axis-monitoring apparatus, the apparatus comprising a laser oscillating means for generating a laser beam, and a light generator means for generating a light for monitoring an axis of the laser beam, characterized in that directing means are arranged between the laser oscillator means and the light generator means for directing the light from the generator means into the laser oscillator means, said directing means includes a ring-shaped mirror having an opening at a center thereof, and concave mirror means are disposed in the laser oscillator means for reflecting the light from the ring-shaped mirror out of the laser oscillator means in such a manner that the axis of the laser beam and axis of the light are coincident with both the light and said laser beam from said laser oscillator means passing through said opening of said ring-shaped mirror.

2. The apparatus according to claim 1, characterized in that a beam splitter means is arranged between the light generator means and the directing means for transforming the light into a ring-shaped light.

3. The apparatus according to claim 2, characterized in that the hole has a 45° elliptical shape.

4. The apparatus according to claim 1, characterized in that focusing means are provided for focusing the light and laser beam.

5. A laser beam axis-monitoring apparatus comprising a laser oscillator means for generating a laser beam, a mirror disposed at one end of the oscillator means, a light generator means for generating a light for monitoring an axis of the laser beam, a beam splitter means for transforming the light into ring-shaped light, and a ring-shaped mirror arranged between the laser oscillator means and the light generator means, the ring-shaped mirror having a hole in a center thereof, the ring-shaped light from the beam splitter means being reflected by the ring-shaped mirror into the laser oscillator means from an opposite end of the laser oscillator means and being reflected by the mirror disposed therein such that the reflected light and the laser beam pass from the laser oscillator means through the hole in the ring-shaped mirror.

6. An apparatus according to claim 5, wherein the hole of the ring-shaped mirror has a 45° elliptical shape.

7. An apparatus according to claim 6, wherein said light generator means is a He-Ne laser.

8. An apparatus according to claim 5, wherein focusing means are provided for focusing the light and laser beam passing through the hole of the ring-shaped mirror.

9. An apparatus according to one of claims 1, or 5, wherein said light generator means is a He-Ne laser.

10. An apparatus according to claim 1, characterized in that means are arranged between the light generator means and the laser oscillator means for splitting the light from the light generator means.

11. A laser beam axis-monitoring apparatus, the apparatus comprising a laser oscillating means for generating a laser beam, and a light generator means for generating a light for monitoring an axis of the laser beam, characterized in that means are arranged between the laser oscillator means and the light generator means for directing the light from the generator means into the laser oscillator means, mirror means are disposed in the laser oscillator means for reflecting the light from the generator means out of the laser oscillator means with the axis of laser beam and axis of the light being coincident, means are arranged between the light generator means and the laser oscillator means for splitting the light from the light generator means, said directing means includes a ring-shaped mirror having a hole at a center thereof such that the light from the light splitting means is reflected by the ring-shaped mirror and directed into the laser oscillator means, both the light and laser beam pass from the laser oscillator means through the hole of the ring-shaped mirror, the light splitting means is a ring converter which includes a rotary drum and a pair of reflection mirrors arranged in the rotary drum at a predetermined angle with respect to each other, and in that light from the light generator means is reflected by the reflection mirrors and becomes a light rotating about a center axis of the rotary drum.

* * * * *